United States Patent
Kinoshita et al.

(10) Patent No.: US 7,211,762 B2
(45) Date of Patent: May 1, 2007

(54) WIRE ELECTRIC DISCHARGE MACHINE AND WIRE ELECTRIC DISCHARGE MACHINING METHOD

(75) Inventors: Mitsuo Kinoshita, Hachiouji (JP); Keiichiro Miyajima, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/272,143

(22) Filed: Nov. 14, 2005

(65) Prior Publication Data

US 2006/0102596 A1    May 18, 2006

(30) Foreign Application Priority Data

Nov. 15, 2004  (JP) ............................ 2004-330811
Jan. 6, 2005   (JP) ............................ 2005-001749

(51) Int. Cl.
    *B23H 7/06* (2006.01)
(52) U.S. Cl. ................................ 219/69.12; 219/69.17
(58) Field of Classification Search ............. 219/69.12, 219/69.17
    See application file for complete search history.

(56) References Cited

U.S. PATENT DOCUMENTS 5,519,181 A * 5/1996 Hsu .......................... 219/69.12
6,984,800 B2 * 1/2006 Abe et al. ................ 219/69.12

FOREIGN PATENT DOCUMENTS

| JP | 63-196324 | A  | * | 8/1988  |
| JP | 63-225109 | A  | * | 9/1988  |
| JP | 3-89523   | A  | * | 4/1991  |
| JP | 6-320340  | A  | * | 11/1994 |
| JP | 7-52000   | A  | * | 2/1995  |
| JP | 2667475   | B2 | * | 10/1997 |

* cited by examiner

*Primary Examiner*—Geoffrey S. Evans
(74) *Attorney, Agent, or Firm*—Staas & Halsey LLP

(57) ABSTRACT

A wire electric discharge machine and a wire electric discharge machining method in which a workpiece set posture is compensated for an error. After a workpiece is set and fixed on a workpiece table, an upper guide measures three or more three-dimensional positions that are not situated on one straight line on an upper surface of the workpiece, utilizing detection of contact with the upper surface. A unit normal vector is obtained, and a shift amount for shift from an originally set vertical position to a corrected position is calculated. In machining, the shift amount is added to the position to compensate for an angle error of a machined surface, and a deviation of a machined point position caused by inclination of the workpiece is collaterally compensated for. Thus, the machined shape cannot be distorted, and the workpiece set posture error can be compensated for.

2 Claims, 13 Drawing Sheets

WIRE ELECTRIC DISCHARGE MACHINE AND WIRE ELECTRIC DISCHARGE MACHINING METHOD

BACKGROUND OF THE INVENTION

1. Field of the Invention

The present invention relates to a wire electric discharge machine and a wire electric discharge machining method, and more specifically, to a wire electric discharge machine and a wire electric discharge machining method capable of appropriately coping with a machining error attributable to set posture inclination of a workpiece to be machined.

2. Description of the Related Art

In general, in a wire electric discharge machine, a workpiece is set and fixed on a workpiece table that is movable within an XY-plane, and voltage is applied between a wire electrode and the workpiece to perform electric discharge machining. The wire electrode is held by upper and lower wire guides. Normally, the workpiece as an object of wire electric discharge machining has a flat lower surface to be in contact with a mounting surface of the workpiece table and a workpiece surface (whole or part of an upper surface) parallel to the lower surface. If the workpiece has the shape of a rectangular parallelepiped, for example, the whole of its one surface forms the lower surface, and its entire upper surface parallel to the lower surface forms the workpiece surface.

If the workpiece is set and fixed on the workpiece table so that its lower surface is intimately in contact with the mounting surface, both the lower surface of the workpiece and the workpiece surface extend parallel to the XY-plane. If the upper and lower guides are kept in the same positions within the XY-plane in machining, therefore, a machined surface is perpendicular to the XY-plane. The so-called vertical machining is performed in this state. If the upper and lower guides are shifted relatively on the XY-plane, moreover, taper machining can be realized such that the machined surface is inclined at a given angle to the XY-plane.

If the workpiece is actually set on the workpiece table, however, its lower surface sometimes may be unevenly lifted above the mounting surface of the table so that the set posture of the workpiece is inclined with respect to the XY-plane, owing to sludge or the like with which the mounting surface is soiled or fine dust adhering to the lower surface of workpiece. During use of the machine, moreover, the workpiece table itself may possibly be inclined with respect to the XY-plane, caused by collision between the workpiece and the guides, secular change, etc.

The following problems (a) and (b) are aroused if the wire electric discharge machining is executed in this state.

(a) Angle error of machined surface: If vertical machining is expected to be performed with the upper and lower guides kept in the same positions within the XY-plane under the presence of the aforesaid posture error, for example, a vertical machined surface cannot be obtained, and a required taper angle cannot be obtained even by taper machining, in some cases. This phenomenon is a machined surface angle error.

(b) Distortion error of machined shape: Inclination of the workpiece causes a fine shift of a machined point that is ordered by a machining program, and a distortion error occurs as the shift changes along a machined line. For example, an irregularly circular machined line may be obtained even if circular machining is programmed. This shape error may possibly be ignored if the inclination of the workpiece is very small. It is not negligible, however, if the workpiece inclination is large or if high machining accuracy is needed.

Conventionally, in order to avoid these problems, an operator must pay close attention to set the workpiece exactly horizontally with respect to the XY-plane. Further, much labor is required to remove soil on the workpiece table or the mounting surface or to keep the workpiece table itself horizontal or correct its inclination. There is no disclosure of any simple conventional technique that can release the operator from the burden of such labor.

SUMMARY OF THE INVENTION

The object of the present invention is to provide a wire electric discharge machine and a wire electric discharge machining method capable of appropriately coping with the aforementioned error problem, thereby improving the machining accuracy.

A wire electric discharge machine of the present invention performs electric discharge machining by applying voltage between a workpiece and a wire electrode while moving the workpiece on an XY-plane relative to the wire electrode. The workpiece has an upper surface and a lower surface parallel to the upper surface and the wire electrode extends between an upper wire guide and a lower wire guide.

According to an aspect of the invention, the wire electric discharge machine comprises: a workpiece table having a workpiece mounting surface on which the workpiece is mounted such that the upper surface of the workpiece confronts the upper guide; means for detecting positions of at least three points not aligned on a straight line on the upper surface of the workpiece mounted on the workpiece table; means for determining an inclination direction of the upper surface of the workpiece with respect to the XY-plane based on the detected positions of the at least three points; means for adjusting the relative positions of the upper wire guide and lower wire guide on the XY-plane so that the wire electrode extends in a direction parallel to the determined inclination direction; and means for performing electric discharge machining regarding the extending direction of the wire electrode between the upper wire guide and the lower wire guide having the adjusted relative positions as a direction perpendicular to the XY-plane.

With the wire electric discharge machine, a wire electric discharge machining method is carried out, which comprises the steps of: mounting the workpiece on a workpiece mounting surface of a workpiece table such that the upper surface of the workpiece confronts the upper guide; detecting positions of at least three points not aligned on a straight line on the upper surface of the workpiece mounted on the workpiece table; determining an inclination direction of the upper surface of the workpiece with respect to the XY-plane based on the detected positions of the at least three points; adjusting the relative positions of the upper wire guide and lower wire guide on the XY-plane so that the wire electrode extends in a direction parallel to the determined inclination direction; and performing electric discharge machining regarding the extending direction of the wire electrode between the upper wire guide and the lower wire guide having the adjusted relative positions as a direction perpendicular to the XY-plane.

According to another aspect of the invention, the wire electric discharge machine comprises: a workpiece table having a workpiece mounting surface on which the workpiece is mounted such that the upper surface of the workpiece confronts the upper guide; means for detecting positions of at least three points not aligned on a straight line on the upper surface of the workpiece mounted on the workpiece table; means for determining an inclination direction of the upper surface of the workpiece with respect to the XY-plane based on the detected positions of the at least three points; means for adjusting the relative positions of the upper wire guide and lower wire guide on the XY-plane so that the wire electrode extends in a direction parallel to the determined inclination direction; and means for performing electric discharge machining regarding the extending direction of the wire electrode between the upper wire guide and the lower wire guide having the adjusted relative positions as a direction perpendicular to the XY-plane, and correcting position of at least one of the upper wire guide and the lower wire guide on the XY-plane based on the determined inclination direction and a position of a machining point on the XY-plane designated by a machining program so that a machined shape same as a machining shape designated on the XY-plane by the machining program is obtained.

With the wire electric discharge machine, a wire electric discharge machining method is carried out, which comprises the steps of: mounting the workpiece on a workpiece mounting surface of a workpiece table such that the upper surface of the workpiece confronts the upper guide; detecting positions of at least three points not aligned on a straight line on the upper surface of the workpiece mounted on the workpiece table; determining an inclination direction of the upper surface of the workpiece with respect to the XY-plane based on the detected positions of the at least three points; adjusting the relative positions of the upper wire guide and lower wire guide on the XY-plane so that the wire electrode extends in a direction parallel to the determined inclination direction; and performing electric discharge machining regarding the extending direction of the wire electrode between the upper wire guide and the lower wire guide having the adjusted relative positions as a direction perpendicular to the XY-plane, and correcting position of at least one of the upper wire guide and the lower wire guide on the XY-plane based on the determined inclination direction and a position of a machining point on the XY-plane designated by the machining program so that a machined shape same as a machining shape designated on the XY-plane by the machining program is obtained.

If the workpiece is not set horizontally with respect to the XY-plane, wire electric discharge machining can be executed with the error (a) or the errors (a) and (b) compensated for by utilizing the result of inclination detection. In consequence, the operating efficiency of the wire electric discharge machining and the machining accuracy can be improved with ease.

BRIEF DESCRIPTION OF THE DRAWINGS

FIGS. 3a and 3b are diagrams illustrating measurement of the workpiece set posture error, in which FIG. 3a shows the relationships between three measurement points on a workpiece surface, workpiece set posture inclination, and the stretching direction of a wire electrode, and FIG. 3b shows an example of measurement at three points with a contact for contact detection on an upper guide;

DETAILED DESCRIPTION

Figure 1:
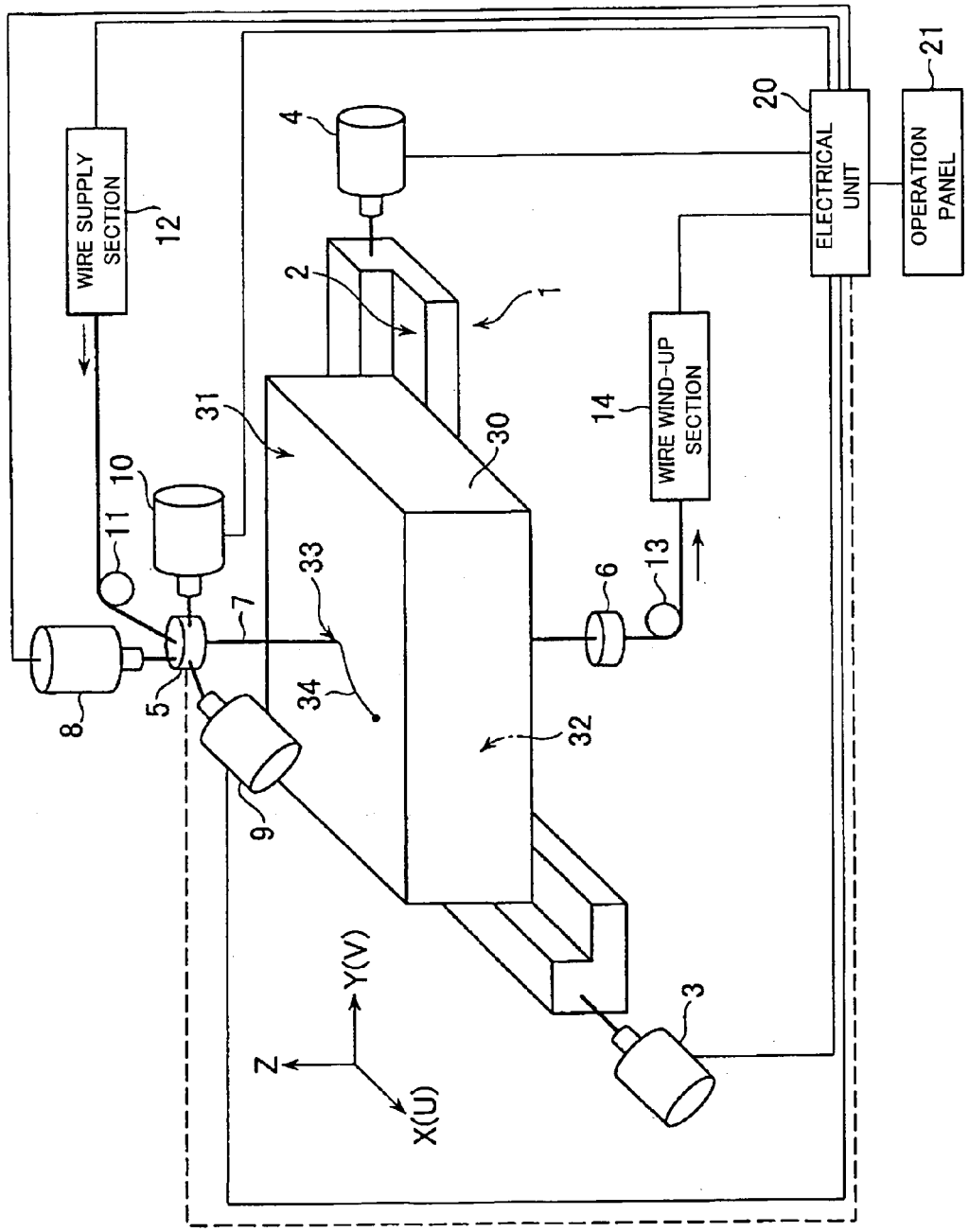
FIG. 1 is a diagram showing a configuration of principal parts of an electric discharge machine according to an embodiment of the present invention.

FIG. 1 is a diagram schematically showing an outline of a wire electric discharge machine according to an embodiment of the present invention. Those portions of the electric discharge machine which are concerned in machining are constructed in the same manner as those of a conventional machine. Numeral 1 denotes a workpiece table on which a workpiece 30 to be machined is set and fixed. The workpiece table 1 has a mounting surface 2 of which the flatness is highly accurate. At the time of machining, the workpiece 30 is set and fixed on the workpiece table so that its lower surface 32 is in contact with the mounting surface 2. The workpiece 30 has its entire upper surface 31 parallel to the lower surface 32. The workpiece 30 is supposed to have a surface (flat region) that is parallel to the lower surface 32. In this illustrated example, the workpiece 30 has the shape of a rectangular parallelepiped in which the entire upper surface 31 is parallel to the lower surface 32. Alternatively, however, only a partial region of the upper surface may be parallel to the lower surface.

Numeral 7 denotes a wire electrode that is supplied from a wire supply section 12 by means of a guide roller 11 and the like to subject the workpiece 30 to electric discharge machining. In machining, the wire electrode 7 is stretched between upper and lower guides 5 and 6 by connecting operation, and voltage is applied to cause electric discharge between the electrode 7 and the workpiece 30. Numeral 14 denotes a wire wind-up section, which has a function to pull and wind up the wire electrode 7 fed through a guide roller 13 with a given tension.

A machined portion is a linear portion in which the wire electrode 7 penetrates the workpiece 30. In this case, it is represented by a machined point 33 on the upper surface 31 (or by a point on the lower surface 32, as mentioned later). In order to move the machined point 33 along an intended path (also called a machined line, which is normally assigned by a machining program) on the workpiece 30, the workpiece table 1 can be moved within an XY-plane by an X-axis drive mechanism 3 and a Y-axis drive mechanism 4 that have servomotors as their respective drive sources. Numeral 34 denotes a movement path (machined line) of the machined point 33. As mentioned later, moreover, the lower guide 6, not the workpiece table 1, may be moved within the XY-plane by the X- and Y-axis drive mechanisms 3 and 4.

Further, the XYZ-position of the upper guide 5 can be adjusted by a Z-axis drive mechanism 8, a U-axis drive mechanism 9, and a V-axis drive mechanism 10. In general, the adjustment of the Z-position is utilized to adjust the distance between the upper guide 5 and the upper surface 31 of the workpiece 30 to a proper value during machining. Besides this, according to the present embodiment, the Z-position adjustment may be utilized measure the inclination (set posture error) of the workpiece 30. On the other hand, the U- and V-axis drive mechanisms 9 and 10 are generally used to adjust angles for the aforementioned tapering work. In the present invention, however, they are also used to adjust the upper guide position to compensate for the set posture error of the workpiece 30 in accordance with the result of the aforesaid measurement. The details of adjustment and correction for measuring and compensating for the set posture error of the workpiece 30 will be described later.

Numeral 20 denotes an electrical unit of a conventional configuration, which incorporates power sources for supplying required voltages and currents to electrical elements including the wire electrode, besides a controller including a CPU, CNC, memory, and input/output device (for external equipment). The CNC controls the servomotors for individually driving the X-, Y-, Z-, U- and V-axes. The input/output (I/O) device performs control of a power source for electric discharge (not shown), wire feed control, display control of a display (attached to an operation panel 21), etc. Further, the electrical unit 20 is provided with a function to monitor load currents of the X-, Y-, Z-, U- and V-axes and display them on a display screen (not shown) in a conventional manner, a function to monitor the potential, discharge current, etc. of the wire electrode 7 for the workpiece 30, and the like. As mentioned later, moreover, the electrical unit 20 may possibly be provided with a function to apply voltage to the upper guide 5 itself (whole or part) and detects current that flows from the upper guide 5 to the workpiece 30.

The way of wire electric discharge machining, which is generally known, will be described very briefly. The respective positions of the X-, Y-, Z-, U- and V-axes are servo-controlled by the CNC in accordance with the machining program stored in the memory of the controller. On the other hand, given discharge voltage and current are supplied to the wire electrode 7, whereby the workpiece 30 is machined along its predetermined cut line or cut surface. Normally, as mentioned before, the XY-position of the machined point 33 is moved by moving the X- and Y-axes. Further, the Z-axis is utilized for the measurement of the set posture error, while the U- and V-axes are used for the upper guide position adjustment based on the result of the measurement.

As is generally known, moreover, the workpiece table 1 is set in a machining tank (not shown) that is filled with a working fluid, and the workpiece 30 is subjected to electric discharge machining in the working fluid. Equipment is additionally provided for circulating the working fluid through an incubator, purifier (ion-exchange resin), etc. to control the temperature and cleanliness of the working fluid, and is controlled by the electrical unit 20. A detailed description of these elements will be omitted, since they are not particularly associated with the present invention.

When the workpiece 30 is set on the workpiece table 1 to undergo electric discharge machining, as has been previously described in the section entitled "Background Art," its posture sometimes may suffer an error, failing to be horizontal (so that the top and lower surfaces 31 and 32 are within the XY-plane). This error causes the aforesaid machined surface angle error (a) or machined shape distortion error (b). For convenience of explanation, items associated with the angle error (a) and a compensation method for it will be described first.

Figure 2:
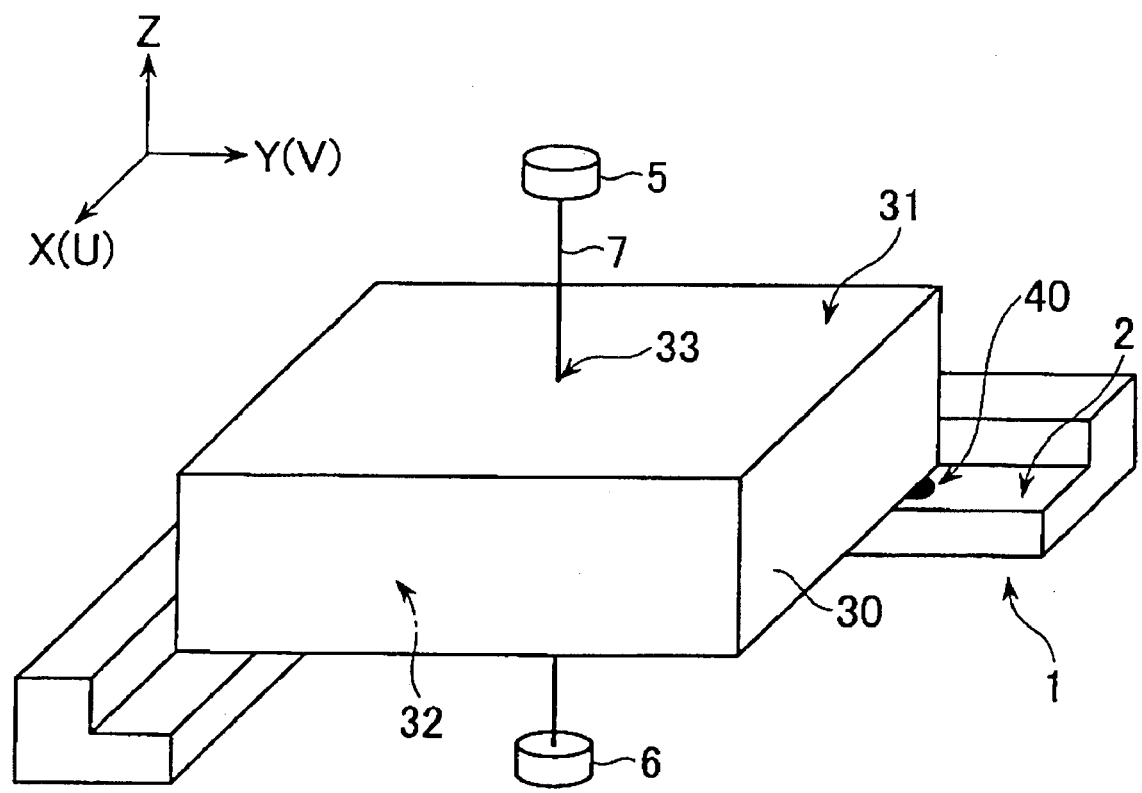
FIG. 2 is diagram showing an example in which a set posture error of a workpiece is subject to an error.

FIG. 2 illustrates the way the workpiece 30 is set inclined on the workpiece table 1. In this situation, sludge 40 exists on the mounting surface 2 of the workpiece table 1, and the right-hand end portion of the workpiece 30 rests on the sludge 40. In this case, the lower surface 32 of the workpiece 30 is lifted, although slightly, above the mounting surface 2 around the right-hand end portion, and fails closely to adhere to the mounting surface 2. Therefore, the top and lower surfaces 31 and 32 are inclined at a small angle to the XY-plane. If machining is performed without noticing or by ignoring this, the machining accuracy is lowered naturally.

If the respective XY-positions of the upper and lower guides 5 and 6 are accurately aligned for vertical machining, for example, the wire electrode 7 is stretched parallel to the Z-axis (or at right angles to the XY-plane). However, the electrode 7 fails to be perpendicular to the upper surface 31 of the workpiece 30, so that taper machining is inevitably executed with the machined surface inclined at an angle corresponding to the workpiece set posture error. The machined point 33 also suffers a shift error corresponding to the workpiece set posture error.

Thereupon, according to the present embodiment, the workpiece set posture error is measured by a method of the present invention, and the relative positions of the upper and lower guides within the XY-plane are adjusted in accordance with the result of the measurement. The aforesaid situation is avoided by doing this. The workpiece set posture error may possibly be measured after wire connection. In order to avoid hindrance by the wire electrode, however, the measurement is made before wire connection.

Figure 3A:
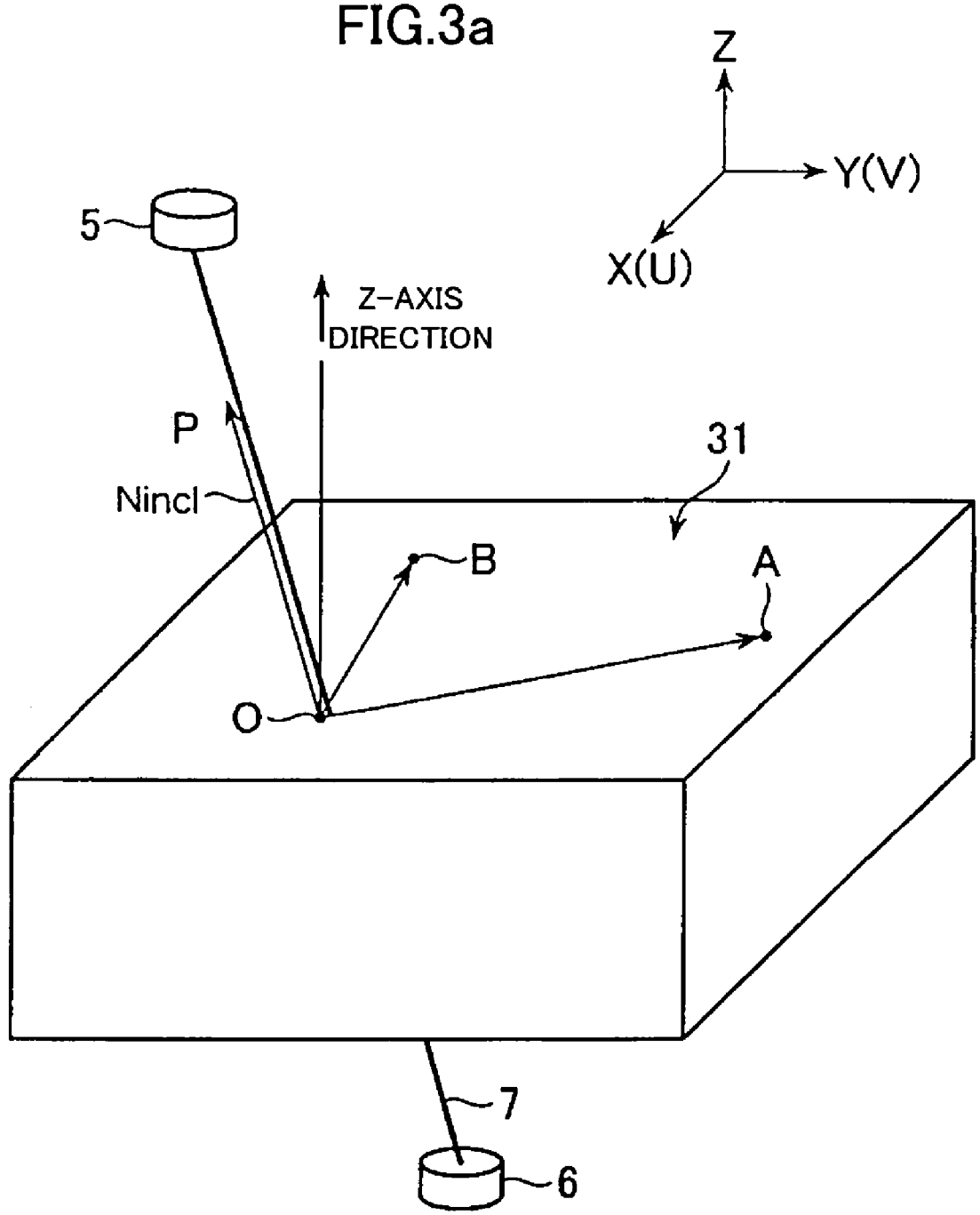

After the workpiece is first set and fixed on the workpiece table 1, three-dimensional positions (X-, Y- and Z-positions) are measured for "at least three points that are not on one straight line" on the upper surface 31. In this case, the three-dimensional positions are measured for three points O, A and B shown in FIG. 3*a*. In FIG. 3*a*, a stretching direction (in which the XY-positions of the upper and lower guides 5 and 6 are not coincident) based on an assumption that the wire electrode 7 has passed a region near the point O at right angles to the upper surface 31 is illustrated with an exaggerated inclination with respect to the Z-axis direction. Symbol Nincl designates a unit normal vector (parallel to the stretching direction) that starts at the point O on the upper surface 31.

The respective positions of the three (or more) points may be measured by utilizing present position data on the U-, V- and Z-axes obtained when the upper guide 5 touches the workpiece 30. The axis value relationships between the U- and V-axes and between the X- and Y-axes are previously stored in the memory of the electrical unit 20 and can be converted as required. For example, the U- and V-axes are set parallel to the X- and Y-axes, respectively, and in this case, the relationships between the axis values can be converted by addition and subtraction of their constant values.

The upper guide 5 and the workpiece 30 can be brought into contact with each other by only gradually manually feeding the Z-axis through operation of the operation panel 21 so that upper guide 5 gradually approaches the upper surface 31 of the workpiece 30, for example.

The contact between the upper guide 5 and the workpiece 30 can be detected by methods (1) and (2). In the method (1), an extremely low current is previously applied between the upper guide 5 and the workpiece 30, and a change of voltage that is caused when the upper guide 5 touches the workpiece 30 is monitored and detected by the electrical unit 20. In the method (2), the load current of the Z-axis motor is monitored by the electrical unit 20, and the contact between the workpiece 30 and the upper guide 5 is sensed as the load current increases.

When the method (1) is used, the whole or part of the upper guide 5 is formed of metal, and a low voltage for contact detection is applied by the electrical unit 20 (see broken line in FIG. 1). If a contact 51 is formed protruding to an infinitesimal distance from the lower surface of the upper guide 5, as shown in FIG. 3b, and if a low voltage for contact detection is applied to the contact 51, more accurate contact detection can be performed.

Then, the outer product of vectors OA and OB is calculated from the respective XYZ-positions of the three points O, A and B on the upper surface (workpiece surface) 31, whereby a normal vector perpendicular to the upper surface 31 is obtained. The unit normal vector Nincl is obtained by dividing the resulting value by the norm of the same vector. The XYZ-components of the unit normal vector Nincl are given by Xn, Yn and Zn. If necessary, four or more positions on the workpiece surface (upper surface 31 in this case) may be measure. In this case, a plurality of unit normal vectors are obtained from a plurality of outer product vectors, and an average of the resulting values is used as a detected inclination value of the workpiece 30. By doing this, the accuracy of inclination detection can be improved.

Figure 4:
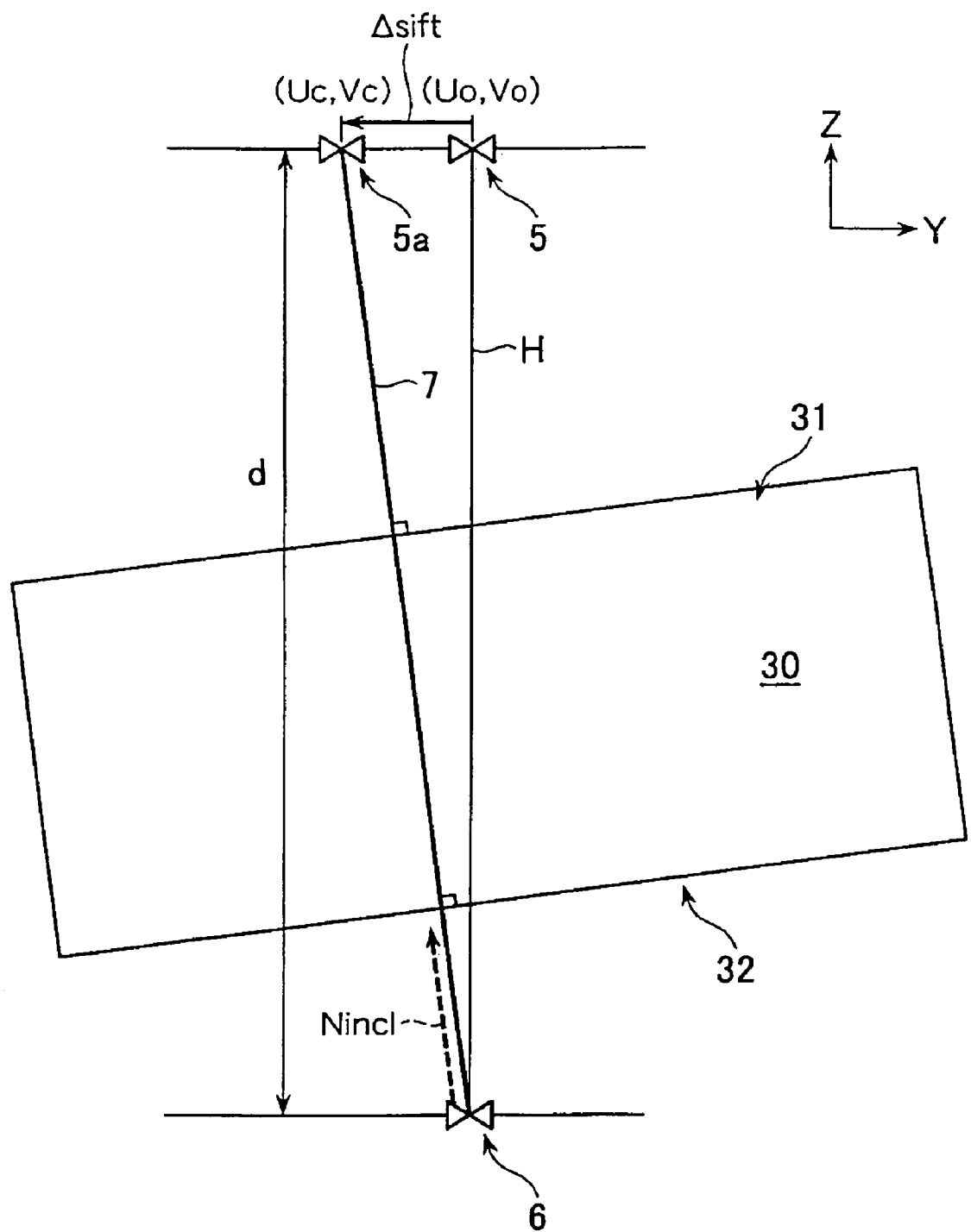
FIG. 4 is a diagram illustrating a method in which an amount of upper guide position adjustment is determined in accordance with the result of the measurement at the three measurement points.

Then, a relative deviation between the respective XY-positions of the upper and lower guides 5 and 6 corresponding to the detected inclination is obtained. More specifically, it is determined how to shift the XY-positions of the upper and lower guides 5 and 6 in order to stretch the wire electrode 7 parallel to the unit normal vector Nincl, as shown in FIG. 4. While the lower guide 6 is immovable, in the present embodiment, the upper guide 5 is movable within the XY-plane by the U- and V-axes. Thus, a shift amount $\Delta$shif ($\Delta U$, $\Delta V$) for the shift of the upper guide from the position denoted by numeral 5 in FIG. 4, that is, a UV-position (U0, V0) in which a line (wire electrode stretching direction) that connects the upper and lower guides 5 and 6 is parallel to the Z-axis, to a corrected position (Uc, Vc) is calculated. The shift amount $\Delta$shif is a two-dimensional vector quantity, and $\Delta U$ and $\Delta V$ are its U and V components, respectively. The values U0 and V0 are stored as parameters for the mechanical positions of the U- and V-axes in the vertical direction in the memory of the electrical unit 20.

The shift amount $\Delta$shif ($\Delta U$, $\Delta V$) is calculated according to $$\Delta U = d*Xn \qquad [1]$$

$$\Delta V = d*Yn \qquad [2].$$

As seen from these equations, the shift amount $\Delta$shif ($\Delta U$, $\Delta V$) depends on (or is proportional to) a distance "d" between the upper and lower guides. Therefore, the distance d between the upper and lower guides is obtained for actual machining. In general, the upper guide 5 is constructed so that it can be moved vertically by the servomotor (Z-axis drive mechanism 8), so that the distance between the upper and lower guides can be easily calculated from the mechanical position of the Z-axis. The upper guide 5 is located in an optional reference Z-position z0, for example, and a distance d0 corresponding to this position is measured beforehand by using appropriate length measurement means (calibration related to the guide distance d). The distance d obtained when the upper guide 5 is situated in an optional position "z" will hereinafter be given by the following equation unless the Z-position of the lower guide 6 changes.

$$d = d0 + (z - z0) \qquad [3]$$

If d0 and z0 obtained by this calibration are previously stored as parameters in the memory of the electrical unit 20, therefore, d can be easily calculated from the axis value of the Z-axis drive mechanism 8 during machining.

The shift amount $\Delta$shif ($\Delta U$, $\Delta V$) obtained in this manner is stored as upper guide position correction data in the memory of the electrical unit 20.

In machining operation, the UV-position of the upper guide 5 is controlled in the following manner.

As mentioned before, the values U0 and V0 are stored as the parameters for the mechanical positions of the U- and V-axes in the vertical direction and are stored in the memory of the electrical unit 20. However, this setting is based on the assumption that there is no workpiece set posture error. If there is the aforesaid set posture error, therefore, the U- and V-axes are positioned with a position (U0+$\Delta U$, V0+$\Delta V$), which is obtained by adding the shift amount $\Delta$shif ($\Delta U$, $\Delta V$) to the position (U0, V0) stored as the parameter for the mechanical position, regarded as a vertical position (which compensates for the set error). By doing this, thereafter, the set posture error is corrected automatically.

If there is an instruction to set the values of the U- and V-axes to U1 and V1, respectively, according to the machining program for machining, for example, the U- and V-axes are positioned with the position changed (adjusted) to (U1+$\Delta U$, V1+$\Delta V$). If this is done, intended vertical machining or taper machining can be achieved as if there were no set posture error of the workpiece 30. Thus, the aforesaid problem (a) can be solved.

Figure 5:
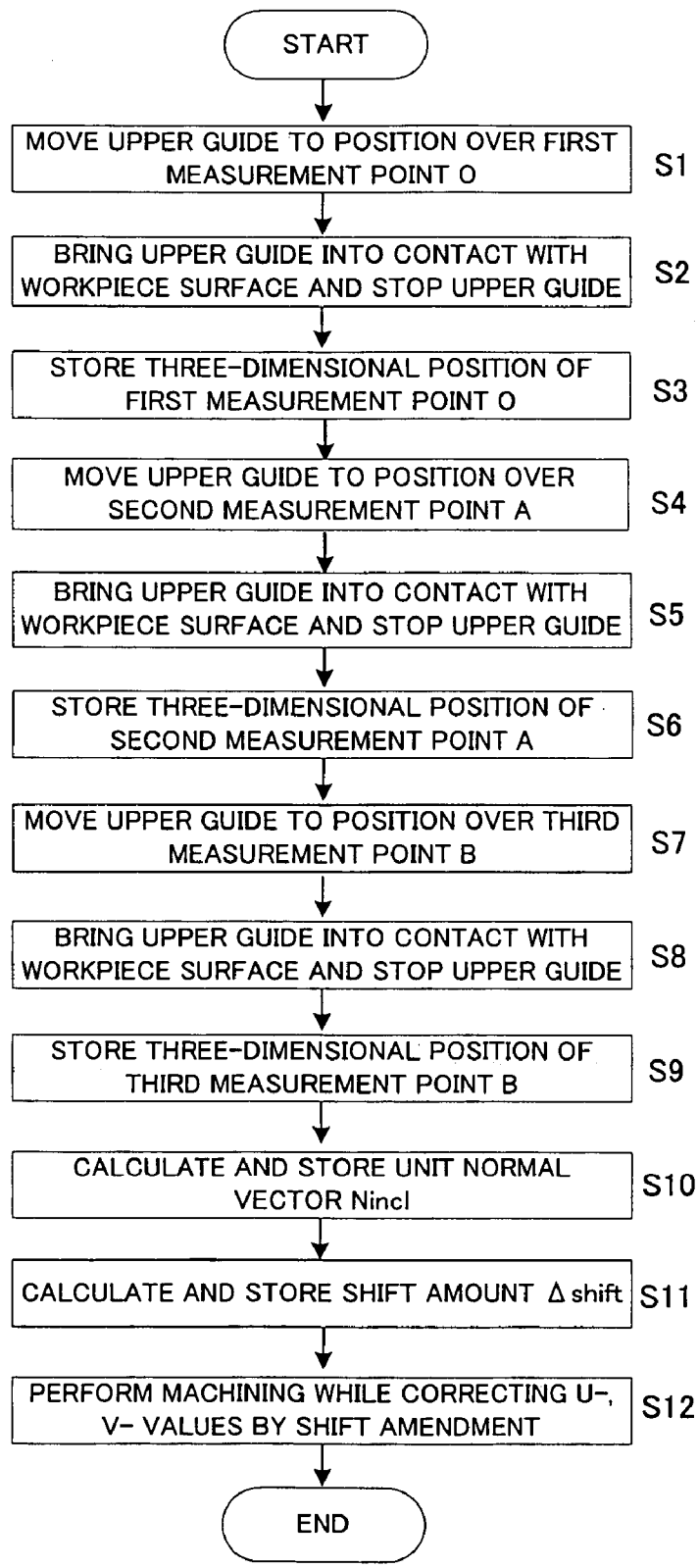
FIG. 5 is a flowchart showing steps of procedure for the upper guide position adjustment according to the embodiment.

FIG. 5 is a flowchart showing the essentials of the steps of procedure described above. The essentials of the steps are as follows. In detecting the contact of the upper guide with the workpiece surface, the aforementioned example of the system is employed in which the load current of the Z-axis servomotor is monitored. The three points O, A and B are used as measurement points. In general, the three points O, A and B on the upper surface 31 may be freely selected unless they are situated on one straight line.

Step S1: The operation panel 21 is operated to move the upper guide 5 to a position over the first measurement point O by X- and Y-axis manual feed.

Step S2: The operation panel 21 is operated to bring the upper guide 5 close to and into contact with the workpiece surface (upper surface) 31 by manual feed and stop it. As mentioned before, the contact is detected by monitoring the load current of the Z-axis servomotor on the display screen. The manual feed is stopped when the load current increases suddenly.

Step S3: The respective values of the X-, Y- and Z-axes at the time of contact are stored as values that represent the three-dimensional position of the first measurement point O.

Step S4: The operation panel 21 is operated to move the upper guide 5 to a position over the second measurement point A by X-, Y- and Z-axis manual feed.

Step S5: The operation panel 21 is operated to bring the upper guide 5 close to and into contact with the workpiece surface (upper surface) 31 by manual feed and stop it. The contact is detected in the same manner as in Step S2.

Step S6: The respective values of the X-, Y- and Z-axes at the time of contact are stored as values that represent the three-dimensional position of the second measurement point A.

Step S7: The operation panel 21 is operated to move the upper guide 5 to a position over the third measurement point B by X-, Y- and Z-axis manual feed.

Step S8: The operation panel 21 is operated to bring the upper guide 5 close to and into contact with the workpiece surface (upper surface) 31 by manual feed and stop it. The contact is detected in the same manner as in Steps S2 and S5.

Step S9: The respective values of the X-, Y- and Z-axes at the time of contact are stored as values that represent the three-dimensional position of the third measurement point B.

Step S10: The outer product of the vectors OA and OB is obtained, and the unit normal vector Nincl is calculated by dividing the resulting value by the norm and stored.

Step S11: The shift amount Δshif (ΔU, ΔV) obtained using the aforesaid calculation equation and stored.

Step S12: The wire electrode 7 is connected and machining is performed. As this is done, the U- and V-axes are shifted by ΔU and ΔV, respectively, and controlled.

The above is a description of the compensation of the angle error (problem (a)) of the machined surface. As mentioned before, however, the machined shape distortion error (problem (b)) may require compensation, in some cases. More specifically, the locus of the machined point (machined shape) ordered by the machining program is distorted depending on the inclination of the set posture of the workpiece. Items associated with the machined shape distortion error and a compensation method for it will now be described with reference to FIGS. 6 to 14.

Figure 6:
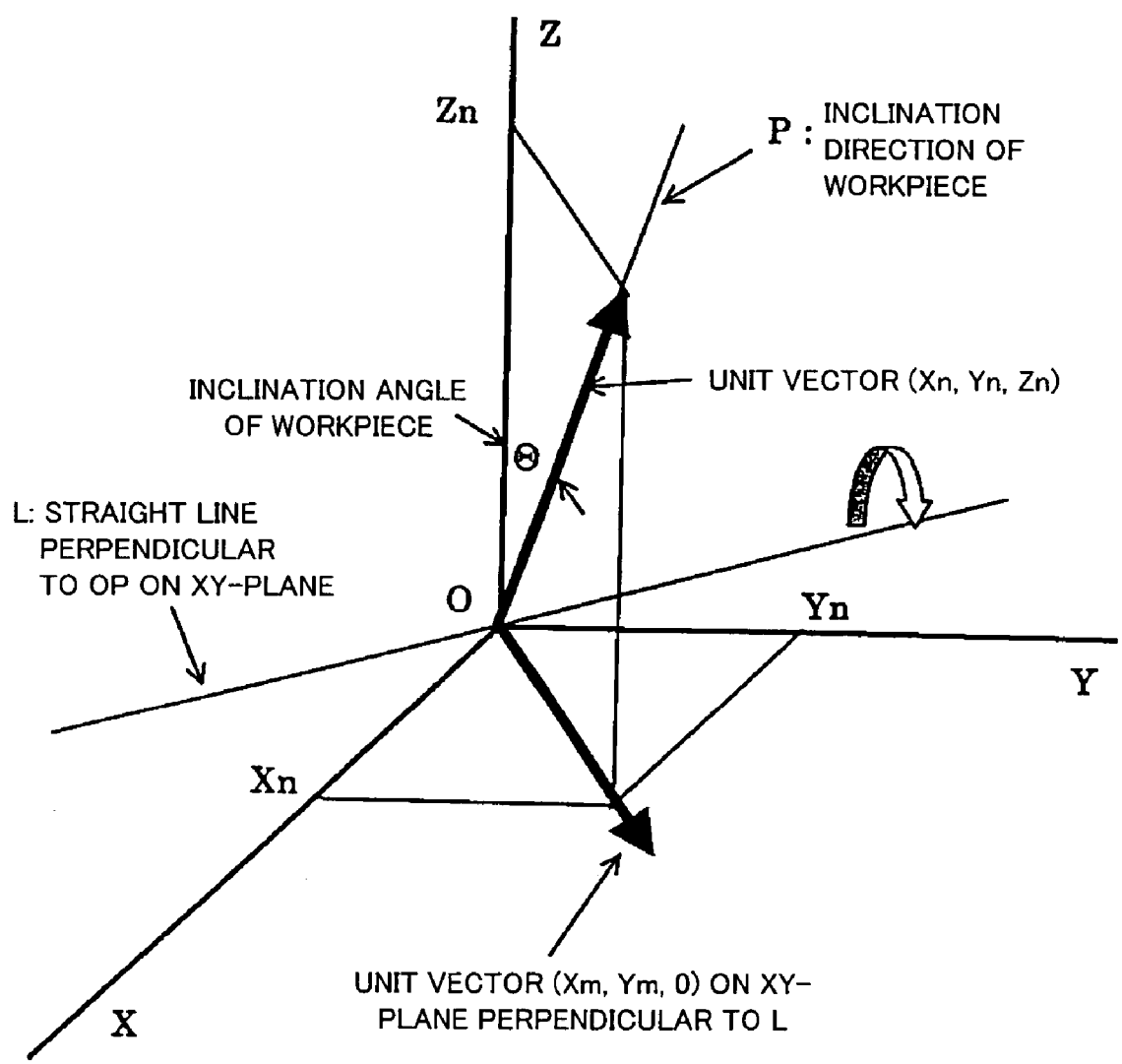
FIG. 6 is a diagram conceptually showing a state in which the workpiece (not shown) is inclined in a direction OP with respect to an XY-plane.

First, FIG. 6 conceptually shows a state in which the workpiece 30 is inclined in a direction OP with respect to the XY-plane. The workpiece itself is not shown in FIG. 6. It can be said, in this case, that the workpiece has rotated from its original horizontal position for a workpiece inclination angle T around a straight line L on the XY-plane perpendicular to OP that is perpendicular to the upper surface 31 of the workpiece. In FIG. 6, (Xn, Yn, Zn) represents a unit vector identical with the aforesaid vector Nincl, that is, a unit vector in the workpiece inclination direction. Further, (Xm, Ym, 0) represents a unit vector on the XY-plane that is perpendicular to the straight line L. Based on a geometric relationship, (Xm, Ym) is obtained as follows:

$$\text{COS}(T) = Zn \quad [4]$$

$$\text{SIN}(T) = \{(1-(Zn)^2)\}^{1/2} \quad [5]$$

$$\text{TAN}(T) = \{(1-(Zn)^2)\}^{1/2}/Zn \quad [6]$$

$$Xm = Xn/\text{SIN}(T) \quad [7]$$

$$Ym = Yn/\text{SIN}(T) \quad [8]$$

Figure 7:
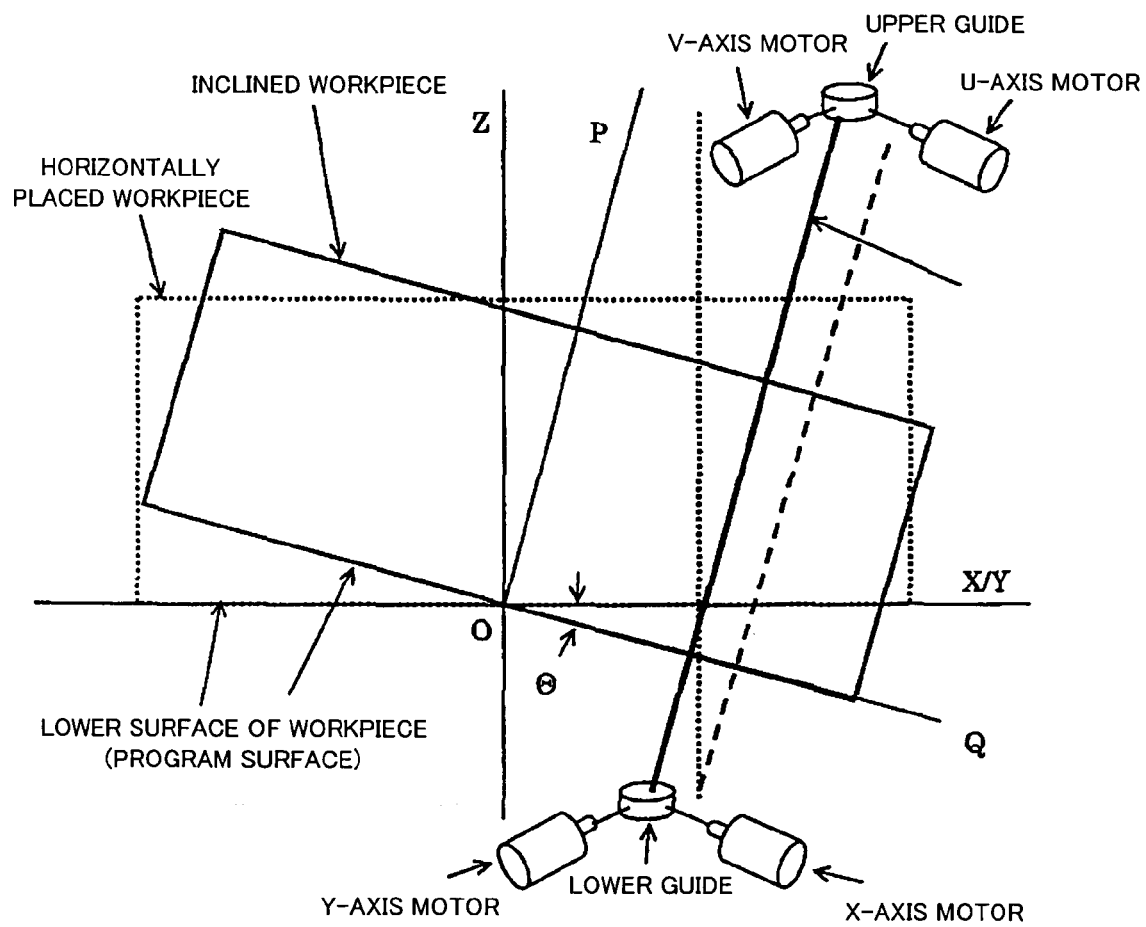
FIG. 7 is an elevation showing the state of FIG. 6 viewed in the direction of a straight line L.
Figure 8:
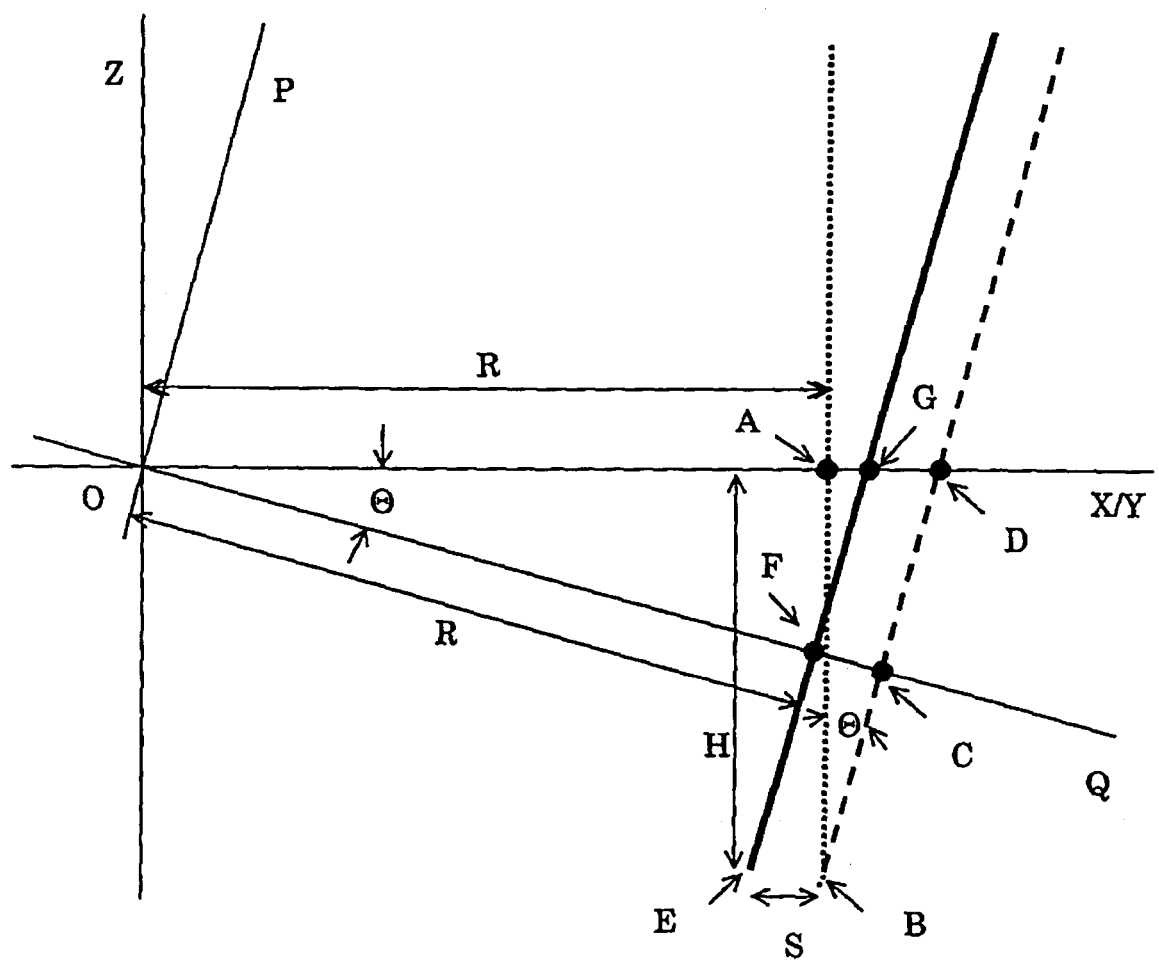
FIG. 8 is another elevation showing the state of FIG. 6 viewed in the direction of the straight line L.

FIGS. 7 and 8 are elevations showing the state of FIG. 6 viewed in the direction of the straight line L.

In these drawings, the respective present positions of the wire electrode and the upper and lower wire guides are projected on a plane that contains OPQ. The wire electrode is corrected according to the aforementioned method of adjustment so that it extends parallel to the workpiece inclination direction OP. For ease of illustration, the lower surface of the workpiece is regarded as a program surface (on which the XY-position is ordered by the machining program), and moreover, the lower guide is directly driven by the X- and Y-axes.

The point A is a position ordered by the machining program, and a perpendicular distance from the point A to the straight line L is supposed to be R. If the workpiece is set horizontally with the wire electrode positioned on the point A, as indicated by broken line in FIG. 7, the wire electrode is on a straight line AB (see FIGS. 7 and 8). If the wire electrode is inclined in the direction OP based on the assumption herein, however, it is on a straight line BCD. A machined position on the program surface or the lower surface of the inclined workpiece is on a point C on a straight line OQ, and is deviated from a point F that is situated at the distance R from the point O.

Thus, if the wire electrode is corrected by the aforesaid adjustment method so as to extend parallel to the inclination direction with the workpiece set inclined, the machined shape of the inclined workpiece on the program surface is somewhat distorted in the inclination direction. If a circular shape is ordered by the machining program, as mentioned before, an elliptic shape is bound to be machined actually. In order to obtain the ordered shape on the program surface of the inclined workpiece, the wire electrode should be on a straight line EFG that passes through the point F.

Thus, the point B on which the lower guide is positioned with the workpiece uninclined should be shifted to a point E when the workpiece is inclined. In this case, the position of the lower guide must be corrected for a distance BE. If the distance between the workpiece table and the lower guide is H, the following equations (9) and (10) hold:

$$OD = R + H * \text{TAN}(T) \quad [9]$$

$$S = BE = OG - OD \quad [10]$$
$$= R(1/\text{COS}(T) - 1) - H * \text{TAN}(T).$$

Here R on the right-hand side must be settled to calculate a correction amount S.

Figure 9:
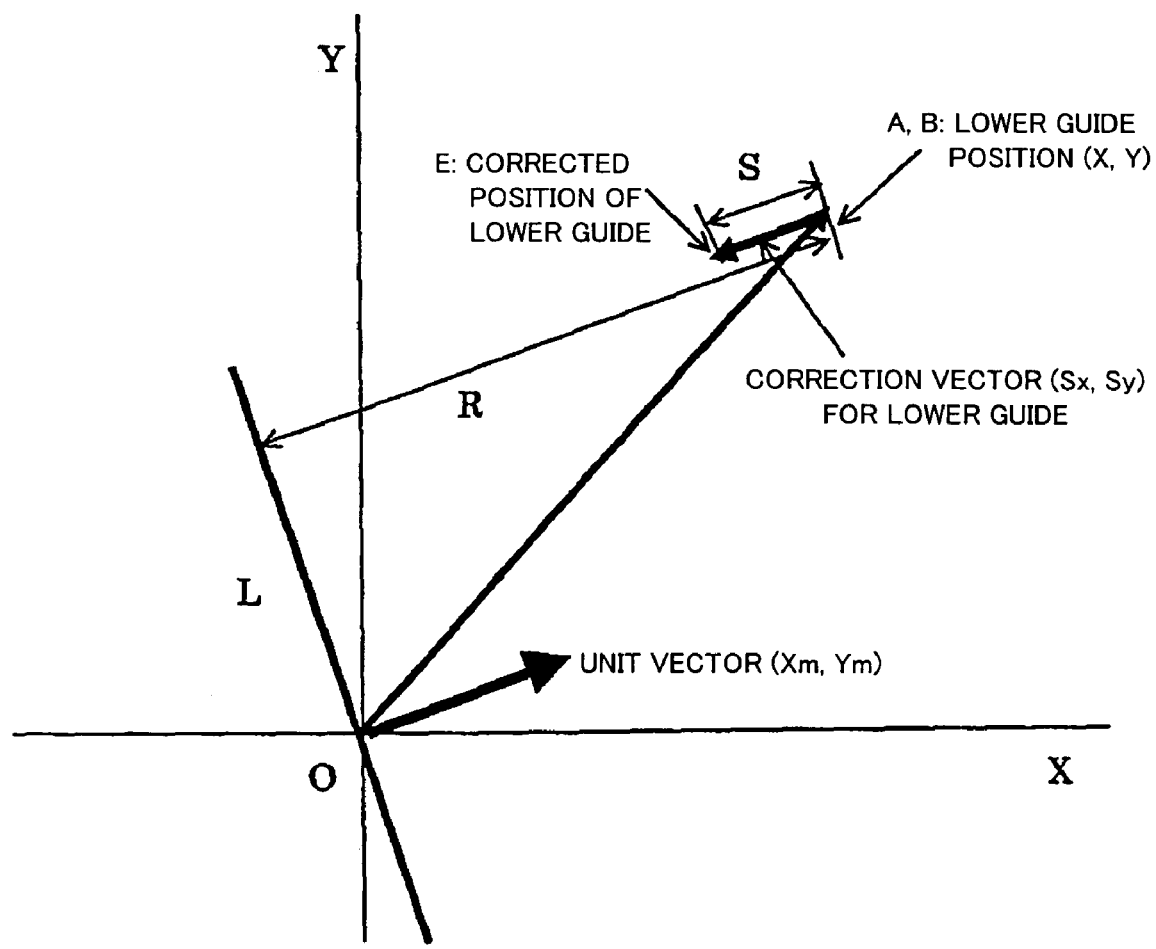
FIG. 9 is an XY plan view showing the state of FIG. 6.

FIG. 9 is an XY plan view showing the same state. The plane illustrated in this drawing may be regarded as a plane of motion of the lower guide. If the coordinate value of the point A (or the point B) ordered by the machining program is (X, Y), the length R of a perpendicular dropped from the point A to the straight line L is $$R = X*Xm + Y*Ym \quad [11]$$

If the position of the lower guide is determined, therefore, the correction amount S for that position can be easily obtained according to the aforesaid equation (10) based on the workpiece inclination direction and the lower guide position.

The direction of the correction is perpendicular to the straight line L, and a correction vector (Sx, Sy) on the XY-plane is given by $$Sx = S*Xm \quad [12]$$

$$Sy = S*Ym \quad [13]$$

Thus, by obtaining the correction vector for each interpolation period and correcting the position of the lower guide, high-accuracy wire electric discharge machining can be performed even if the workpiece is subject to a set error in the horizontal direction. It is necessary, therefore, only that the processing shown in the flowchart of FIG. 13 be executed for each interpolation period as the machining program is run. The essentials of the steps are as follows.

Step S101: Conventional interpolation processing is executed. More specifically, a present lower guide command position (Xj, Yj) is obtained by performing interpolation computation according to the machining program.

Step S102: A present lower guide command increment (ΔXj, ΔYj) is obtained by computing the difference between the present lower guide command position (Xj, Yj) and a last lower guide command position (Xi, Yi).

Step S103: A distance Rj from the present lower guide command position (Xj, Yj) to the straight line L is obtained.

Step S104: A present lower guide correction amount Sj is obtained.

Step S105: A lower guide correction vector (Sxj, Syj) is obtained.

Step S106: A present lower guide correction vector increment (ΔSxj, ΔSyj) is obtained by computing the difference between the lower guide correction vector (Sxj, Syj) and a last lower guide correction vector (Sxi, Syi).

Step S107: The lower guide command increment (ΔXj, ΔYj) and the lower guide correction vector increment (ΔSxj, ΔSyj) are added up, and the resulting sum is outputted to a servo control system to drive the servomotors for the X- and Y-axes.

Step S108: The lower guide command position and the lower guide correction vector are updated (and stored) for the next calculation.

In general, distortion compensation for the machined shape can be substantially achieved by executing the correction of the lower guide (X- and Y-axes) in the aforesaid manner. In large-angle taper machining, however, similar correction must be simultaneously collaterally applied for each interpolation period to the upper guide (U- and V-axes) for controlling the taper angle. This correction will now be described with additional reference to FIGS. 10, 11, 12 and 14. In the description to follow, numerals will be added individually to symbols that represent points, so that slash marks (/) will be interposed between the symbols to discriminate between the points.

Figure 10:
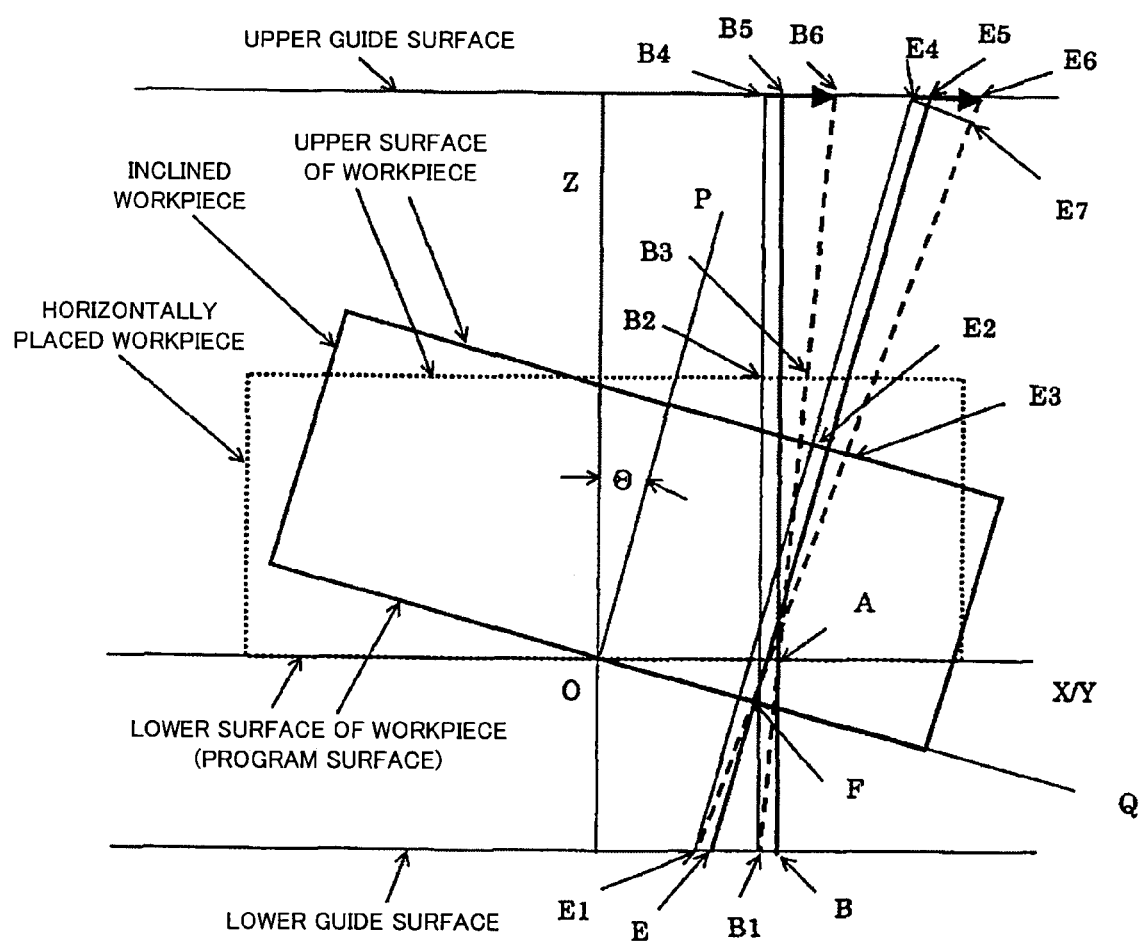
FIG. 10 is an elevation showing the positional relationships between the wire electrode and upper and lower wire guides in taper machining, as viewed from the straight line L.

FIG. 10 is an elevation showing the positional relationships between the wire electrode and the upper and lower wire guides in taper machining, as viewed from the straight line L (see FIG. 6 and related description).

More specifically, FIG. 10 is a view in which the respective positions of the wire electrode and the upper and lower wire guides are projected on the plane that contains OPQ. If the point A (at the distance R from O) is ordered by the machining program, as mentioned before, the wire electrode is on a straight line B/A/B5 when the workpiece is set horizontally. If taper machining is ordered, on the other hand, the wire electrode is on a straight line B1/A/B6 that is inclined at an angle to the straight line B/A/B5 at the point A.

If the workpiece is set inclined at the angle T to the horizontal direction, as shown in FIG. 6, the wire electrode is on a straight line E/F/E5 that passes through the point F (at the distance R from O) on the lower surface of the inclined workpiece in vertical machining. In taper machining, moreover, the wire electrode is on a straight line E1/F/E6 that passes through the point F and is inclined at the same angle to the straight line E/F/E5. In this state, a correction amount B/E or B1/E1 of the lower guide is obtained as the aforementioned correction amount of the lower guide (X- and Y-axes). The position of the upper guide is controlled by a deviation vector (U, V) from the vertical state of the wire electrode.

The correction amount of the deviation vector can be obtained by analyzing the relationship between deviations B4/B6 and E4/E6. A horizontal deviation B2/B3 on the upper surface of the workpiece is equal to a deviation E2/E3 for the case where the workpiece is set inclined, and triangles B1/B4/B6 and E1/E4/E7 are substantially congruent with each other. Therefore, deviations E4/E7 and B4/B6 that pass through a point E4 and are parallel to the workpiece are equal.

Figure 11:
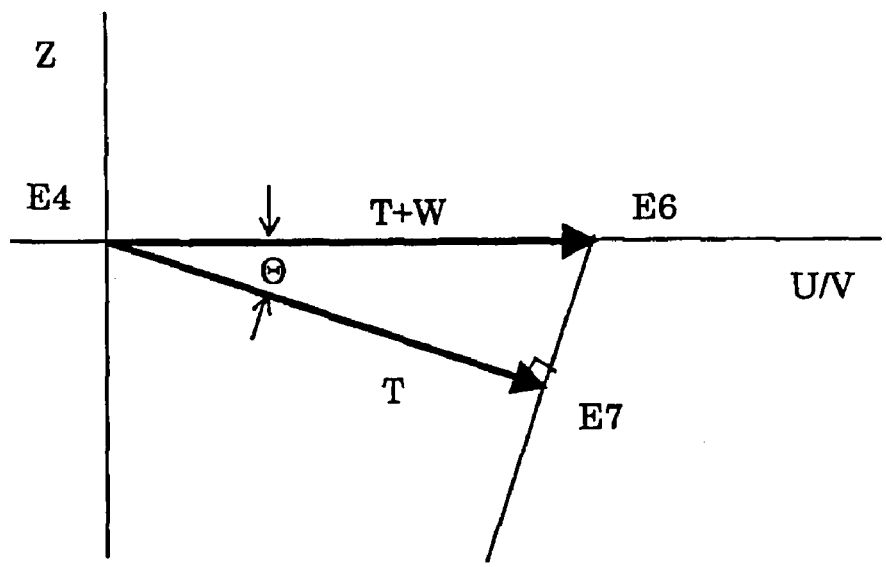
FIG. 11 is an enlarged view of a portion E4/E5/E6/E7 shown in FIG. 10.

FIG. 11 is an enlarged view of a portion E4/E5/E6/E7 shown in FIG. 10. If the distance of the deviation B4/B6 or E4/E7 and the correction amount of the deviation E4/E6 compared with the deviation B4/B6 are T and W, respectively, the length of the E4/E6 is T+W, and the correction amount W can be expressed as $$W = T(1/\cos(T) - 1) \quad [14]$$

Figure 12:
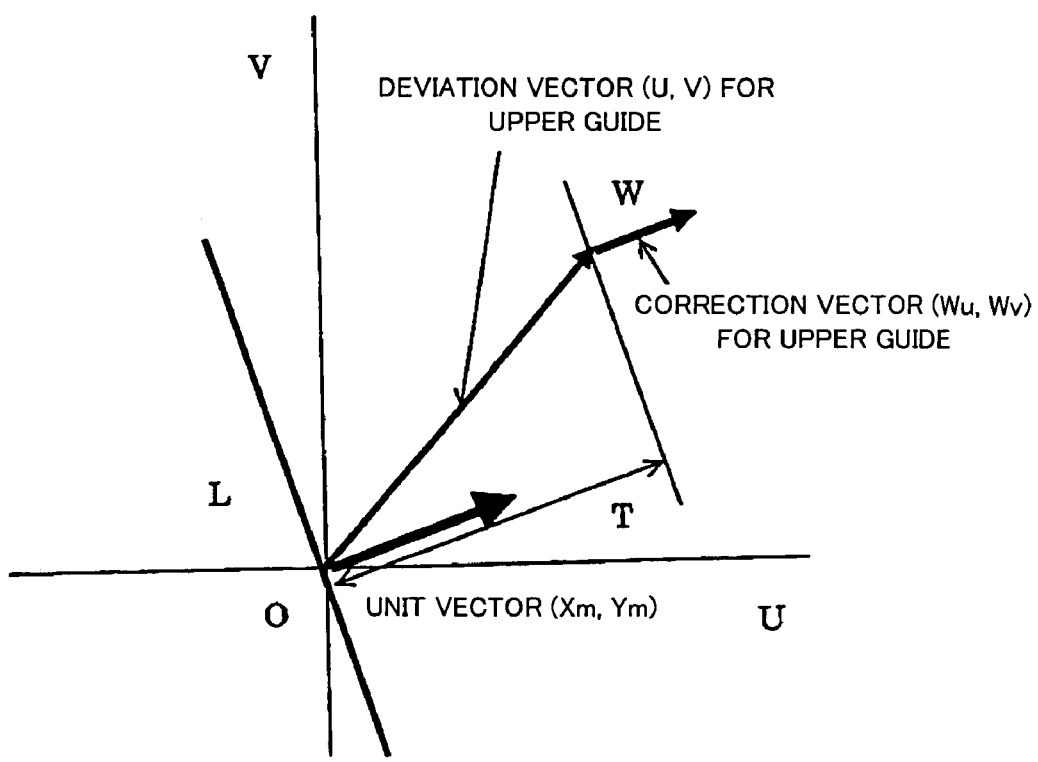
FIG. 12 is an XY (or UV) plan view showing the relationship between a deviation vector of the upper guide and its correction vector.
Figure 13:
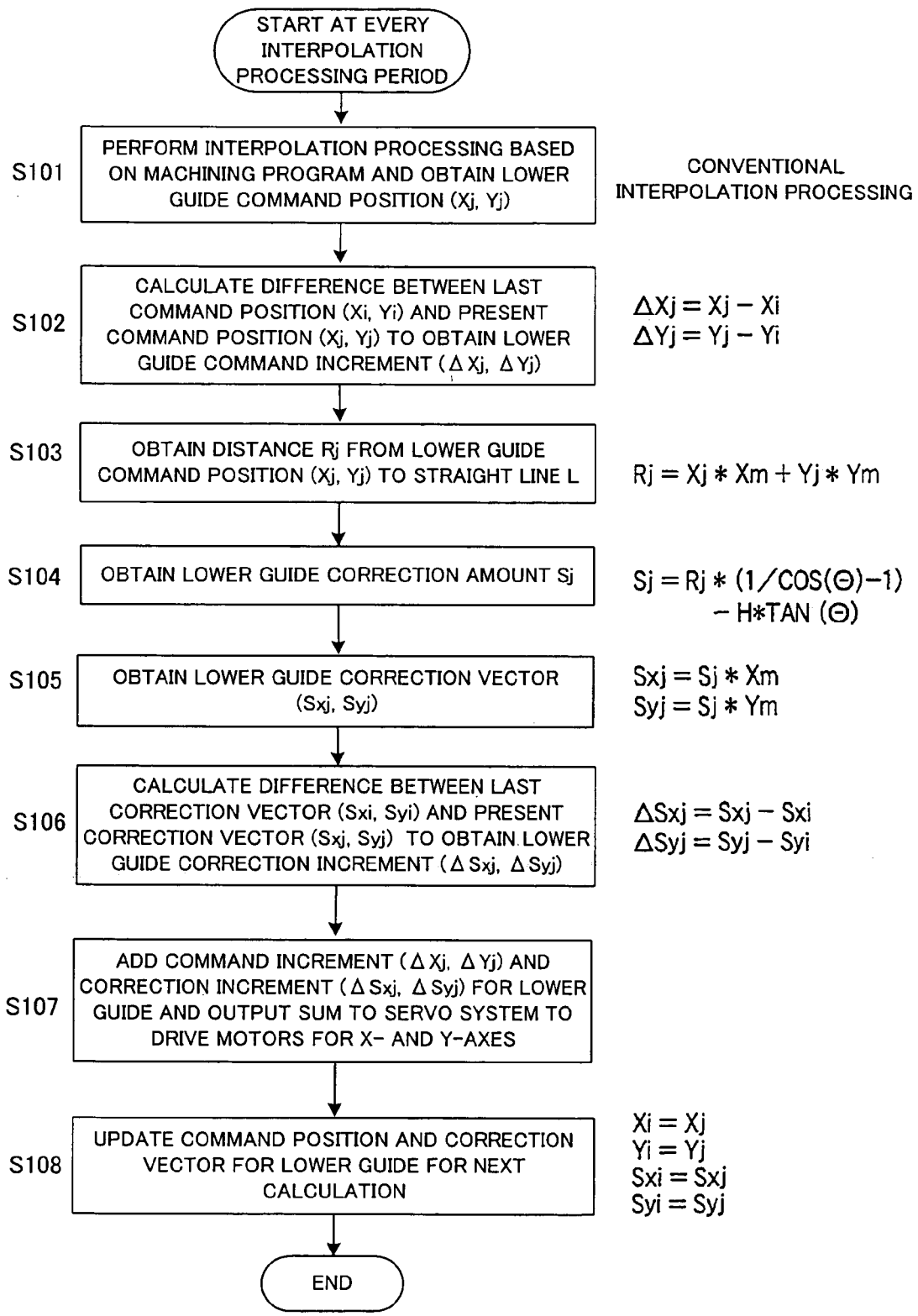
FIG. 13 is a flowchart illustrating processing for compensating for a machined shape distortion error in lower guide position correction.
Figure 14:
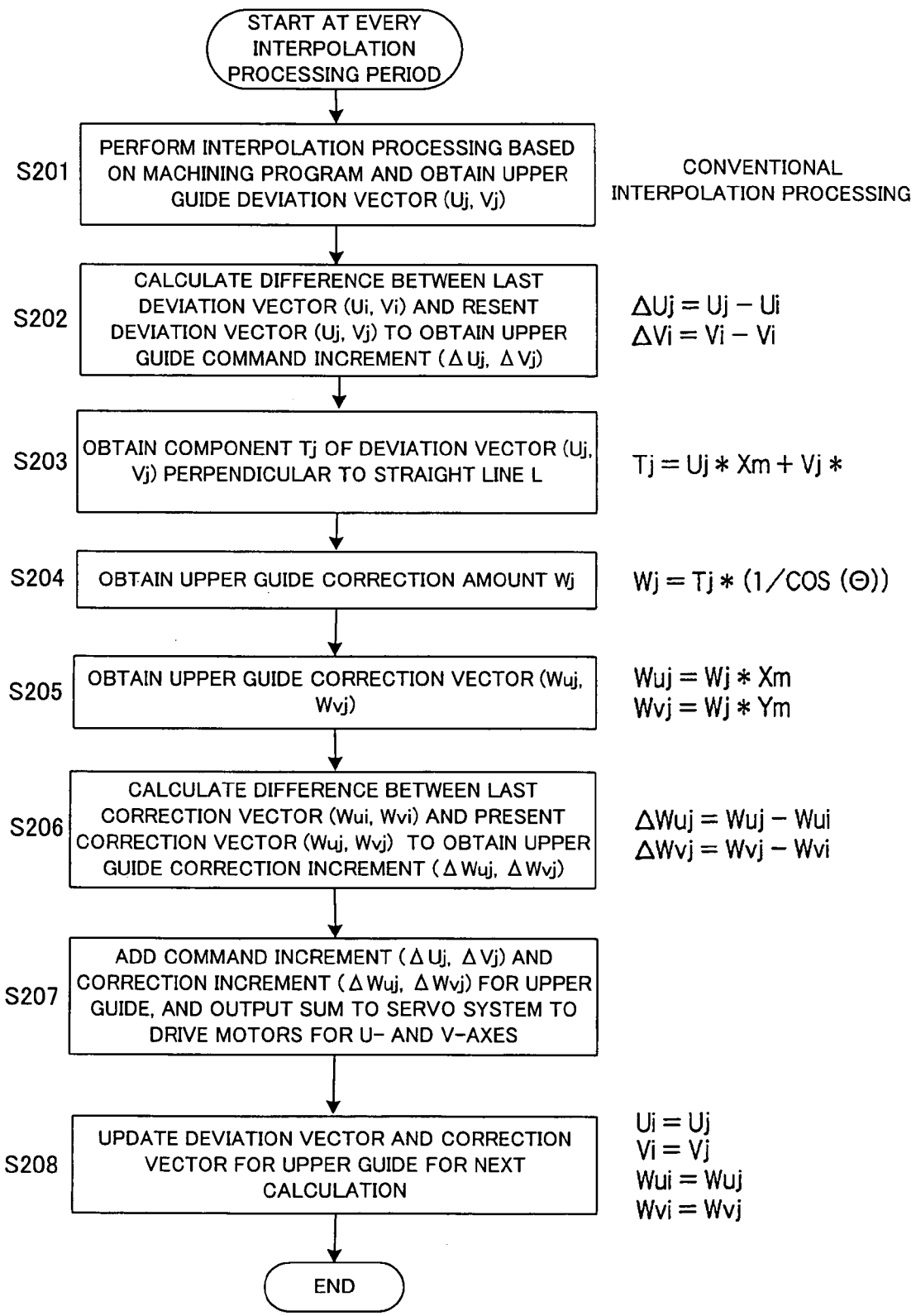
FIG. 14 is a flowchart illustrating processing for compensating for a machined shape distortion error in upper guide position correction.

FIG. 12 is an XY (or UV) plan view showing the relationship between the deviation vector of the upper guide and its correction vector calculated in this manner. In FIG. 12, T represents a directional component that is perpendicular to the deviation vector of the upper guide and the straight line L. It is obtained as the inner product of a unit vector that is perpendicular to the deviation vector (U, V) of the upper guide and the straight line L as follows:

$$T = U^* Xm + V^* Ym \quad [15]$$

Since an upper guide correction vector (Wu, Wv) is perpendicular to the straight line L, we have $$Wu = T^* Xm \quad [16]$$

$$Wv = T^* Ym \quad [17].$$

Accordingly, the upper guide correction vector can be corrected in accordance with the inclination direction of the workpiece and the upper guide correction vector, so that high-accuracy taper machining can be achieved even if the workpiece is inclined. Thus, it is necessary only that the processing shown in the flowchart of FIG. 14 be collaterally executed for each interpolation period as the machining program is run for reproduction. The essentials of the steps are as follows.

Step 201: In processing executed in combination with Step S101, a present upper guide deviation vector (Uj, Vj) is obtained by performing interpolation computation according to the machining program.

Step 202: A present upper guide command increment (ΔUj, ΔVj) is obtained by computing the difference between the present upper guide deviation vector (Uj, Vj) and a last upper guide deviation vector (Ui, Vi).

Step 203: A perpendicular component Tj of the present upper guide deviation vector (Uj, Vj) perpendicular to the straight line L is obtained.

Step 204: A present upper guide correction amount Wj is obtained.

Step 205: An upper guide correction vector (Wuj, Wvj) is obtained.

Step 206: A present upper guide correction increment (ΔWuj, ΔWvj) is obtained by computing the difference between the upper guide correction vector (Wuj, Wvj) and a last upper guide correction (Wui, Wvi).

Step 207: The upper guide command increment (ΔUj, ΔVj) and the upper guide correction increment (ΔWuj, ΔWvj) are added up, and the resulting sum is outputted to the servo control system to drive the servomotors for the U- and V-axes.

Step 208: The upper guide deviation vector and the upper guide correction vector are updated (and stored) for the next calculation.

As described above, the distortion compensation of the machined shape can be achieved at a high level by the correction of the upper guide (U- and V-axes) simultaneously and collaterally with the correction of the lower guide (X- and Y-axes).

What is claimed is:

1. A wire electric discharge machine for performing electric discharge machining by applying voltage between a workpiece and a wire electrode while moving the workpiece on an XY-plane relative to the wire electrode according to a machining program, the workpiece having an upper surface and a lower surface parallel to the upper surface and the wire electrode extending between an upper wire guide and a lower wire guide, said wire electric discharge machine comprising:
   a workpiece table having a workpiece mounting surface on which the workpiece is mounted such that the upper surface of the workpiece confronts the upper guide;
   means for detecting positions of at least three points not aligned on a straight line on the upper surface of the workpiece mounted on said workpiece table;
   means for determining an inclination direction of the upper surface of the workpiece with respect to the XY-plane based on the detected positions of the at least three points;
   means for adjusting the relative positions of the upper wire guide and lower wire guide on the XY-plane so that the wire electrode extends in a direction parallel to the determined inclination direction; and
   means for performing electric discharge machining regarding the extending direction of the wire electrode between the upper wire guide and the lower wire guide having the adjusted relative positions as a direction perpendicular to the XY-plane, determining an increment of a position of a machining point that is calculated at each interpolating period on the XY-plane, and correcting position of at least one of the upper wire guide and the lower wire guide on the XY-plane based on the determined inclination direction and the determined increment of the position of the machining point so that a machined shape same as a machining shape designated on the XY-plane by the machining program is obtained.

2. A wire electric discharge machining method of performing electric discharge machining by applying voltage between a workpiece and a wire electrode while moving the workpiece on an XY-plane relative to the wire electrode according to a machining program, the workpiece having an upper surface and a lower surface parallel to the upper surface and the wire electrode extending between an upper wire guide and a lower wire guide, said wire electric discharge machining method comprising the steps of:
   mounting the workpiece on a workpiece mounting surface of a workpiece table such that the upper surface of the workpiece confronts the upper guide;
   detecting positions of at least three points not aligned on a straight line on the upper surface of the workpiece mounted on said workpiece table;
   determining an inclination direction of the upper surface of the workpiece with respect to the XY-plane based on the detected positions of the at least three points;
   adjusting the relative positions of the upper wire guide and lower wire guide on the XY-plane so that the wire electrode extends in a direction parallel to the determined inclination direction; and
   performing electric discharge machining regarding the extending direction of the wire electrode between the upper wire guide and the lower wire guide having the adjusted relative positions as a direction perpendicular to the XY-plane, determining an increment of a position of a machining point that is calculated at each interpolating period on the XY-plane, and correcting position of at least one of the upper wire guide and the lower wire guide on the XY-plane based on the determined inclination direction and the determined increment of the position of the machining point so that a machined shape same as a machining shape designated on the XY-plane by the machining program is obtained.

* * * * *

UNITED STATES PATENT AND TRADEMARK OFFICE
CERTIFICATE OF CORRECTION

PATENT NO. : 7,211,762 B2 Page 1 of 1
APPLICATION NO. : 11/272143
DATED : May 1, 2007
INVENTOR(S) : Mitsuo Kinoshita et al.

It is certified that error appears in the above-identified patent and that said Letters Patent is hereby corrected as shown below:

Sheet 3 of 13, After FIG.3a insert

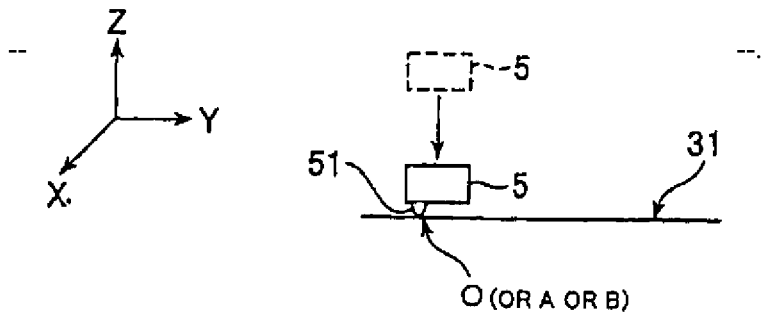

Sheet 13 of 13 (After Box No. S203), Line 1, change " $Tj = Uj^*Xm + Vj^*$ " to

-- $Tj = Uj^*Xm + Vj^*Ym$ --.

Signed and Sealed this

Seventh Day of July, 2009

JOHN DOLL
*Acting Director of the United States Patent and Trademark Office*